(12) United States Patent
Saito et al.

(10) Patent No.: US 8,213,160 B2
(45) Date of Patent: Jul. 3, 2012

(54) SOLID ELECTROLYTIC CAPACITOR AND METHOD OF MANUFACTURING SAME

(75) Inventors: Takeshi Saito, Sendai (JP); Yuji Yoshida, Sendai (JP); Takeo Kasuga, Sendai (JP); Koji Sakata, Sendai (JP); Katsuhiro Yoshida, Sendai (JP); Masanori Takahashi, Sendai (JP)

(73) Assignee: NEC Tokin Corporation, Sendai-shi (JP)

( * ) Notice: Subject to any disclaimer, the term of this patent is extended or adjusted under 35 U.S.C. 154(b) by 214 days.

(21) Appl. No.: 12/076,075

(22) Filed: Mar. 13, 2008

(65) Prior Publication Data
US 2008/0232039 A1  Sep. 25, 2008

(30) Foreign Application Priority Data

Mar. 23, 2007 (JP) ................... 2007-076537

(51) Int. Cl.
  *H01G 4/228* (2006.01)
  *H01G 9/10* (2006.01)
  *H01G 9/00* (2006.01)
  *H05K 5/03* (2006.01)
(52) U.S. Cl. .............. 361/540; 361/538; 361/523
(58) Field of Classification Search .................. 361/523, 361/538, 540
  See application file for complete search history.

(56) References Cited

U.S. PATENT DOCUMENTS

| | | | | |
|---|---|---|---|---|
| 6,057,634 | A * | 5/2000 | Yoshino et al. | 310/348 |
| 6,807,045 | B2 * | 10/2004 | Arai et al. | 361/302 |
| 6,870,728 | B1 | 3/2005 | Burket et al. | |
| 7,016,180 | B2 * | 3/2006 | Yoshihara et al. | 361/540 |
| 7,057,882 | B2 * | 6/2006 | Fujii et al. | 361/540 |
| 7,821,795 | B2 * | 10/2010 | Sugaya et al. | 361/761 |
| 2005/0073818 | A1 | 4/2005 | Hirano et al. | |
| 2006/0087795 | A1 * | 4/2006 | Nagasawa et al. | 361/306.3 |
| 2006/0130300 | A1 * | 6/2006 | Kobayashi et al. | 29/25.03 |

(Continued)

FOREIGN PATENT DOCUMENTS

JP  A-06-168854  6/1994

(Continued)

OTHER PUBLICATIONS

Korean Office Action issued in Korean Patent Application No. 10-2008-0017461 on Oct. 7, 2009 (with translation).

(Continued)

*Primary Examiner* — Eric Thomas
*Assistant Examiner* — David M Sinclair
(74) *Attorney, Agent, or Firm* — Oliff & Berridge, PLC

(57) ABSTRACT

A solid electrolytic capacitor including a solid electrolytic capacitor component comprises a porous anode body 2 composed of valve metal having a anode lead 1 protruding therefrom, a anode oxide film, a solid electrolyte layer 4, a graphite layer 5, a silver paste layer 6, a resist layer 3 separating the anode lead 1 used as a anode portion and the porous anode body 2 used as a cathode portion, and a anode lead element 7 connected to the anode lead 1, the anode oxide film, solid electrolyte layer 4, graphite layer 5, silver paste layer 6 being successively formed on the surface of the porous anode body 2, wherein the solid electrolytic capacitor component is bonded on a mounting substrate 21 having a anode terminal 21a, a cathode terminal 21b, and an insulating portion 21c therebetween with a precuring insulating adhesive 9 formed on the insulating portion 21c of the mounting substrate 21 and precuring conductive adhesives 8 formed on the anode terminal and cathode terminal, and sealed with exterior resin 10.

5 Claims, 1 Drawing Sheet

U.S. PATENT DOCUMENTS

2007/0274026 A1 * 11/2007 Togashi et al. ................ 361/540

FOREIGN PATENT DOCUMENTS

| JP | A-6-176981 | 6/1994 |
| JP | A-2001-267181 | 9/2001 |
| JP | A-2002-367862 | 12/2002 |
| JP | A-2004-221534 | 8/2004 |
| JP | A-2004-363220 | 12/2004 |
| JP | A-2005-197297 | 7/2005 |
| JP | 2006073638 A * | 3/2006 |
| JP | A-2006-156903 | 6/2006 |
| JP | A-2006-190929 | 7/2006 |
| WO | WO 2006082838 A1 * | 8/2006 |

OTHER PUBLICATIONS

Korean Office Action dated Mar. 10, 2010 for Korean Application No. 10-2008-0017461 (with translation).
Japanese Patent Office, Notice of Reason for Rejection for Japanese Patent Application No. 2007-076537 (with English translation), May 11, 2011, pp. 1-3 (pp. 1-2 for translation).

* cited by examiner

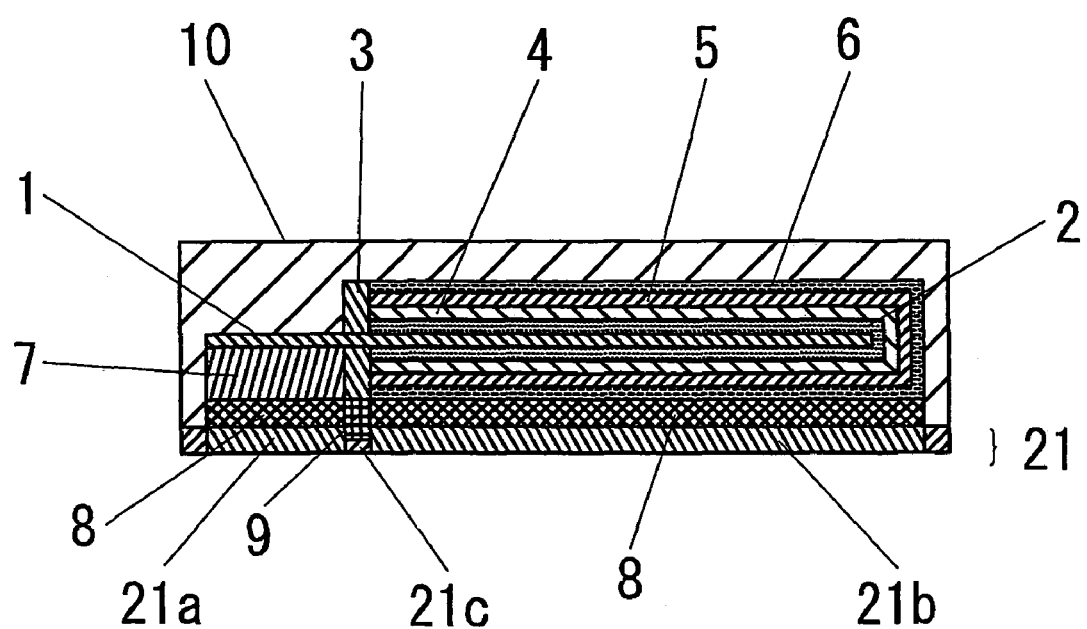

SOLID ELECTROLYTIC CAPACITOR AND METHOD OF MANUFACTURING SAME

BACKGROUND OF THE INVENTION

1. Field of the Invention

The present invention relates to a solid electrolytic capacitor and a method of manufacturing the same. Particularly, the present invention relates to a solid electrolytic capacitor having narrower distance between an anode and a cathode, and a method of manufacturing the same.

2. Description of Related Art

In recent years, due to the increasing speed of a CPU, even a capacitor used for decoupling has been required to have an electrical characteristic having low impedance in a high-frequency area from several MHz to several GHz for the stabilization of power supply voltage and the reduction in high-frequency noise. In addition, to reduce inductance caused by wiring, the placement of decoupling capacitors directly below or near a CPU has been becoming mainstream technique. Furthermore, even if such capacitors are mounted near a CPU, it also requires reliability against the thermal stress caused by the start and stop of the CPU.

Therefore, a decoupling capacitor is required to have low impedance, miniaturization, low-profile, and high-reliability. Currently, such requirements are satisfied by using a plurality of parallel-connected multilayer ceramic capacitors.

However, since a multilayer ceramic capacitor has small capacitance and thereby a large number of them have to be stacked one another to increase the capacitance, it has to compromise the height restriction. Therefore, tens of multilayer ceramic capacitors have to be mounted near a CPU, and it has increased the manufacturing processes.

Accordingly, the effort for a solid electrolytic capacitor having lower size, lower profile, and lower impedance has been made in order to develop a capacitor having capacitance large enough to replace tens of multilayer ceramic capacitors with the single one and lower impedance. Furthermore, since the clock frequency of a CPU has increased to hundreds MHz to several GHz, it has been desired to reduce an equivalent series resistance (ESR) as well as an equivalent series inductance (ESL) to achieve lower impedance.

Japanese Unexamined Patent Publication No. 2006-190929 discloses a solid electrolytic capacitor in which the electrode-wiring distance between a capacitor component and a terminal has been shortened, thereby shortening the current loop to achieve lower ESL. Further, Japanese Unexamined Patent Publication No. 2002-367862 discloses a chip-type solid electrolytic capacitor in which a conductive adhesive is used at an anode and a cathode to narrow the distance between the anode and cathode, thereby shortening the current loop to achieve lower ESL.

In the solid electrolytic capacitor of Japanese Unexamined Patent Publication No. 2006-190929, a conductive paste is used to connect between the cathode terminal and the cathode portion of the component. However, if the distance between the anode and cathode is too narrow in an attempt to achieve lower ESL, the conventional liquid conductive paste will spread to the anode side. Therefore a certain distance between anode and cathode is necessary in consideration of the oozing. Accordingly, there is a limitation in shortening the current loop in an attempt to achieve lower ESL. Furthermore, a similar oozing will also occur in Japanese Unexamined Patent Publication No. 2002-367862 as the distance between the anode and cathode becomes too narrow. In addition, if a silver paste is used as the conductive adhesive for the anode side to lower the connection resistance, a short will occur due to the silver migration in a moisture-resistance load test or the like.

Furthermore, it hinders smooth transfer-molding into tight places such as the periphery of component wires during the exterior molding. In addition, since it has a poor adhesive property, interfaces and spaces were created, and the migration could not be suppressed.

SUMMARY OF THE INVENTION

In consideration of these circumstances, the object of the present invention is to provide a solid electrolytic capacitor capable of suppressing silver migration and achieving a low ESL property even if the distance between an anode and a cathode is narrowed, and a method of manufacturing the same.

In accordance with one aspect, the present invention provides a solid electrolytic capacitor including a solid electrolytic capacitor component comprising: a porous anode body composed of valve metal having a anode lead protruding therefrom, a anode oxide film, a solid electrolyte layer, a graphite layer, a silver paste layer, a resist layer separating the anode lead used as a anode portion and the porous anode body used as a cathode portion, and a anode lead element connected to the anode lead, the anode oxide film, solid electrolyte layer, graphite layer, and silver paste layer being successively formed on the surface of the porous anode body, wherein the solid electrolytic capacitor component is bonded on a mounting substrate having a anode terminal, a cathode terminal, and an insulating portion therebetween with a precuring insulating adhesive formed on the insulating portion of the mounting substrate and precuring conductive adhesives formed on the anode terminal and cathode terminal, and sealed with exterior resin.

The precuring insulating adhesive is preferably composed of at least one substance selected from silicone resin, epoxy resin, polyamide-imide resin, polyimide resin, urethane resin, and phenolic plastic. The shortest distance between the anode portion and cathode portion of the solid electrolytic capacitor component is preferably between 0.1 to 0.7 mm.

In accordance with another aspect, the invention provides a method of manufacturing a solid electrolytic capacitor comprising: successively forming a anode oxide film, a solid electrolyte layer, a graphite layer, a silver paste layer on the surface of a porous anode body composed of valve metal having a anode lead protruding therefrom; forming a resist layer separating the anode lead used as a anode portion and the porous anode-body used as a cathode portion; connecting a anode lead element to the anode lead and forming a solid electrolytic capacitor component; applying a precuring insulating adhesive on an insulating portion of a mounting substrate having a anode terminal, a cathode terminal, and the insulating portion therebetween; applying and precuring a precuring conductive adhesives on the anode terminal and cathode terminal; bonding the anode lead element to the conductive adhesive on the anode terminal and bonding the silver paste layer to the conductive adhesive on the cathode terminal; and sealing the solid electrolytic capacitor component with exterior resin.

In accordance with one aspect of the present invention, precuring conductive adhesives are formed on anode and cathode terminals of the mounting substrate, a precuring insulating adhesive is formed on a insulating portion separating the anode and cathode terminals, and the solid electrolytic capacitor component and the mounting substrate are bonded together with the adhesives in a partially-hardened state, and therefore it enables to bond them without causing the adhesive oozing, thereby allowing shorter distance between anode and cathode terminals. As a result, the invention can provide a solid electrolytic capacitor capable of suppressing silver migration and having a low ESL property, and a method of manufacturing the same.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 1 is a cross-section of a solid electrolytic capacitor in accordance with an embodiment of the present invention.

DESCRIPTION OF THE PREFERRED EMBODIMENTS

An embodiment in accordance with the present invention is explained hereinafter with reference to the drawing. FIG. 1 is a cross-section of a solid electrolytic capacitor in accordance with an embodiment of the present invention.

A solid electrolytic capacitor component used for a solid electrolytic capacitor in accordance with an embodiment of the invention comprises a porous anode body 2 composed of valve metal such as aluminum, niobium and tantalum, a anode oxide film (not shown), a solid electrolyte layer 4, a graphite layer 5, a silver paste layer 6, a anode lead 1 protruding from the porous anode body 2, and a anode lead element 7 connected to the anode lead. The anode oxide film is formed on the porous anode body 2, and a solid electrolyte layer 4, a graphite layer 5 and a silver paste layer 6 are successively formed on the anode oxide film.

Planar aluminum foil having surfaces roughened by etching, a sintered body prepared by burying tantalum or niobium wire into tantalum or niobium powder, press-molding the powder, and sintering the molding, or similar material may be used for the porous anode body 2 having an anode lead 1 protruding therefrom. To separate the anode lead 1 used as an anode portion and the porous anode body 2 used as a cathode portion, a resist layer 3 composed of epoxy resin containing a silica filler or the like is applied and dried before or after the anode oxide film formation. Then, after the solid electrolyte layer 4 composed of a conductive polymer layer or the like is formed on the anode oxide film, a graphite layer 5 and a silver paste layer 6 are applied and dried. Then, a anode lead element 7 composed of metallic material such as a lead frame composed of copper material successively plated with Ni, Cu and Ag is connected to the anode lead 1 by resistance welding, ultrasonic welding, or similar manner to form a solid electrolytic capacitor component.

A mounting substrate 21 used for a solid electrolytic capacitor in accordance with an embodiment of the invention comprises anode and cathode terminals 21a and 21b separated into a component connection surface and a mounting surface respectively by a insulating portion 21c. Each of the terminals 21a and 21b is connected on the component connection surface and mounting surface respectively. For example, a printed board having anode and cathode terminals formed by copper foils on both surfaces and connected by through-holes is usable. Furthermore, with regard to the anode terminal of the mounting substrate, the number of the component connection surfaces and mounting surfaces may be equal to the number of the anode terminal. Alternatively, the number of anode terminal may be increased in an attempt to achieve low ESL through the magnetic canceling of the currents flowing into and out of the component side. Further, since it is suited for multi-terminal land mounting on the periphery of a CPU, a conversion substrate having staggered multiple anode and cathode terminals on the mounting side is usable.

The connection between a solid electrolytic capacitor component and a mounting substrate is explained hereinafter. A precuring insulating adhesive 9 is applied on the insulting portion 21c of a mounting substrate by screen printing or similar manner, and brought to a partially-hardened state, for example, by drying it for a short time. Then, a precuring conductive adhesive 8 is applied on the anode and cathode terminals 21a and 21b, and dried to a partially-hardened state. After arranging the anode lead element 7 of the solid electrolytic capacitor component on the precuring conductive adhesive 8 formed on the anode terminal 21a, arranging the silver paste layer 6 on the precuring conductive adhesive 8 formed on the cathode terminal 21b, and arranging the resist layer 3 on the precuring insulating adhesive 9, the solid electrolytic capacitor component and mounting substrate 21 are connected and adhered by thermocompression bonding or similar manner. Then, it is sealed with exterior resin 10 by transfer-molding or similar manner.

The terms "precuring conductive adhesive" and "precuring insulating adhesive" mean adhesives capable of re-adhering by thermocompression at certain temperature and pressure after being applied, and dried or heated for a short time to suppress wettability and oozing. For example, silicone resin, epoxy resin, polyamide-imide resin, polyimide resin, urethane resin, and phenolic plastic are usable.

Furthermore, the distance between the anode portion and cathode portion of the solid electrolytic capacitor component is preferably between 0.1 to 0.7 mm. In other words, in view of the mounting precision of the solid electrolytic capacitor on a mounting substrate, it is difficult to reduce the distance between the anode and cathode to less than 0.1 mm. Meanwhile, judging from experiments, the rates of short failures are substantially the same regardless of the usage of the precuring conductive adhesive in accordance with the invention when the distance is above 0.7 mm. Therefore, the optimal distance is 0.1 to 0.7 mm to achieve low ESL and low defective fraction.

First Embodiment

The detail of First embodiment is explained hereinafter with reference to FIG. 1 showing the cross-section of a solid electrolytic capacitor in accordance with an embodiment of the present invention. Firstly, after a porous anode body 2 composed of planar aluminum foil having surfaces roughened by etching was anodized to form an oxide film, a resist layer 3 composed of epoxy resin containing a silica filler was formed in order to separate the anode and cathode portions. On this occasion, the formation condition for the anode oxide film formation was 25 V so that it does not break the oxide film when a 10 V moisture-resistance load test is performed on the finished product. Then, a conductive polymer used as the solid electrolyte layer 4 was formed on the anode oxide film, and a graphite layer 5 and a silver paste layer 6 were formed to form a cathode lead. These layers 5 and 6 are used as a cathode layer. Then, a anode lead element 7 composed of a lead frame which was prepared by successively plating Ni, Cu and Ag on copper base metal was welded to the anode lead 1 composed of aluminum foil which is used as a anode layer divided by the resist layer 3, by ultrasonic welding in order to form a aluminum solid electrolytic capacitor component. The distance between the anode and cathode was 0.3 mm.

Then, after a precuring insulating adhesive 9 composed of epoxy resin containing a silica filler was applied on the insulting portion 21c used as a anode-cathode separator portion of a mounting substrate 21 composed of a glass-epoxy substrate by screen printing, the adhesive was dried for a short time (105° C., 15 minutes) to partially harden it. Then, a precuring conductive adhesive 8 composed of epoxy resin was applied on the anode and cathode terminals 21a and 21b used as anode and cathode electrodes, and dried to a partially-hardened state in similar manner to the aforementioned insulating adhesive. Then, after the aluminum solid electrolytic capacitor component was bonded to the mounting substrate 21 by thermocompression bonding, it was sealed with exterior resin 10 composed of epoxy resin by transfer-molding.

First Comparative Example

Solid electrolytic capacitors were manufactured in the same manner as First embodiment except that the precuring insulating adhesive was not used.

10 V voltage was applied to each of twenty solid electrolytic capacitors manufactured by each of First embodiment and First comparative example with 85% RH at 85° C., and after a lapse of 2000 hours, the number of short occurrences was counted to evaluate Ag migration. Table 1 shows the results.

TABLE 1

| Valve metal | First Embodiment | First Comparative Example |
|---|---|---|
| Aluminum | 0 | 3 |

It can be seen from the Table 1 that the migration was prevented in the aluminum solid electrolytic capacitors manufactured by First embodiment so that it can improve the reliability over conventional solid electrolytic capacitors having no precuring insulating adhesive applied on the anode and cathode terminals.

Second Embodiment

The detail of Second embodiment is explained hereinafter with reference to FIG. 1 showing the cross-section of a solid electrolytic capacitor in accordance with an embodiment of the present invention. Tantalum wire used as the anode lead 1 was buried in pulverized tantalum powder, and the tantalum powder was pressed and sintered to prepare a tantalum pellet. Then, the pellet was anodized, and an oxide film was formed. Using it as a cathode portion, a resist layer was formed at the base portion of the anode lead 1 to separate the anode and cathode portions. At this time, in contrast to First embodiment, the formation voltage was 40 V. Then, a conductive polymer layer used as the solid electrolyte layer 4 was formed on the cathode portion, and a graphite layer 5 and a silver paste layer 6 were formed to form a cathode lead. Then, a anode lead element 7 composed of a lead frame which was prepared by successively plating Ni, Cu and Ag on copper base metal was welded to the anode lead 1 composed of the tantalum wire divided by the resist layer 3 by resistance welding to form a tantalum solid electrolytic capacitor component. Then, using similar mounting substrate, precuring insulating adhesive, and precuring conductive adhesive to those of First embodiment, it was sealed with exterior material in similar manner to First embodiment.

Third Embodiment

Solid electrolytic capacitors were manufactured in the same manner as Second embodiment except that niobium powder and niobium wire were used as substitutes for tantalum powder and tantalum wire respectively.

Second Comparative Example

Solid electrolytic capacitors were manufactured in the same manner as Second embodiment except that the precuring insulating adhesive was not used.

Third Comparative Example

Solid electrolytic capacitors were manufactured in the same manner as Third embodiment except that the precuring insulating adhesive was not used.

10 V voltage was applied to each of twenty solid electrolytic capacitors manufactured by each of Second and Third embodiments and Second and Third comparative examples with 85% RH at 85° C., and after a lapse of 2000 hours, the number of short occurrences was counted to evaluate Ag migration. Table 2 shows the results.

TABLE 2

| | Number of short occurrences |
|---|---|
| Second Embodiment | 0 |
| Third Embodiment | 0 |
| Second Comparative Example | 3 |
| Third Comparative Example | 4 |

Similar to First embodiment, it can be seen from the Table 2 that the migration was prevented in Second and Third embodiments so that it can improve the reliability over the conventional solid electrolytic capacitors having no precuring insulating adhesive applied on the anode and cathode terminals.

Forth to Seventh Embodiments

A lead frame used as the anode lead element was welded by ultrasonic welding to the anode lead of each of aluminum solid electrolytic capacitor components of First embodiment, for which the distance between the anode portion and cathode portion was varied to 0.1, 0.3, 0.5 and 0.7 during the aluminum solid electrolytic capacitor component formation, to manufacture solid electrolytic capacitor components. Then, similar to First embodiment, the solid electrolytic capacitor component was bonded to a mounting substrate having the same distance between the anode portion and cathode portion as the solid electrolytic capacitor component by a precuring insulating adhesive and a precuring conductive adhesive, and sealed with exterior resin to manufacture a solid electrolytic capacitor.

Forth to Seventh Comparative Examples

Solid electrolytic capacitors were manufactured in the same manner as Forth to Seventh embodiments except that an epoxy resin conductive adhesive containing sliver as a filler was used to bond the solid electrolytic capacitor component and a mounting substrate, and the precuring insulating adhesive was not used.

Twenty solid electrolytic capacitors were manufactured by each Forth to Seventh embodiments and Forth to Seventh comparative examples. ESL (100 MHz) was measured in each of them, and the number of short failure occurrences caused by the silver oozing during the bonding of the solid electrolytic capacitor component and mounting substrate was counted. Table 3 shows the results as ESL and process failure for different distances between anode and cathode and ways of exterior sealing.

TABLE 3

| | Exterior | Distance between anode and cathode (mm) | ESL (100 MHz) | Number of process failures (number) |
|---|---|---|---|---|
| Fourth Embodiment | Capacitors of First Embodiment | 0.1 | 40 pH | 0 |
| Fifth Embodiment | | 0.3 | 70 pH | 0 |
| Sixth Embodiment | | 0.5 | 100 pH | 0 |
| Seventh Embodiment | | 0.7 | 130 pH | 0 |
| Fourth Comparative Example | Capacitors having non-precuring conductive adhesive and no insulating adhesive | 0.1 | 40 pH | 20 |
| Fifth Comparative Example | | 0.3 | 70 pH | 10 |
| Sixth Comparative Example | | 0.5 | 100 pH | 4 |
| Seventh Comparative Example | | 0.7 | 130 pH | 0 |

From the results, it can be seen that the prevention of the conductive adhesive oozing is effective to achieve low ESL and to reduce process failure rate even when the distance between the anode and cathode is reduced by the method of construction in accordance with the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A solid electrolytic capacitor including a solid electrolytic capacitor component, the solid electrolytic capacitor component comprising:
    a porous anode body composed of valve metal having an anode lead protruding therefrom;
    an anode oxide film;
    a solid electrolyte layer;
    a graphite layer;
    a silver paste layer;
    a resist layer separating the anode lead used as an anode portion and the porous anode body used as a cathode portion; and
    an anode lead element connected to the anode lead,
    the anode oxide film, the solid electrolyte layer, the graphite layer, and the silver paste layer being successively formed on the surface of the porous anode body, wherein
    the solid electrolytic capacitor component is bonded on a mounting substrate having an anode terminal, a cathode terminal, and an insulating portion therebetween with a precuring insulating adhesive layer formed on the insulating portion of the mounting substrate and precuring conductive adhesive layers formed on the anode terminal and the cathode terminal, and sealed with exterior resin,
    the precuring insulating adhesive layer formed on the insulating portion is in contact with both of the precuring conductive adhesive layers formed on the anode terminal and the cathode terminal,
    the resist layer of the solid electrolytic capacitor component is bonded to the insulating portion of the mounting substrate by the precuring insulating adhesive layer, and
    the resist layer, the insulating portion and the precuring insulating adhesive layer each have substantially a same width.

2. The solid electrolytic capacitor of claim 1 wherein the precuring insulating adhesive layer is composed of at least one substance selected from silicone resin, epoxy resin, polyamide-imide resin, polyimide resin, urethane resin, and phenolic plastic.

3. The solid electrolytic capacitor of claim 2 wherein the shortest distance between the anode portion and cathode portion of the solid electrolytic capacitor component is between 0.1 to 0.7 mm.

4. The solid electrolytic capacitor of claim 1 wherein the shortest distance between the anode portion and cathode portion of the solid electrolytic capacitor component is between 0.1 to 0.7 mm.

5. A method of manufacturing a solid electrolytic capacitor comprising:
    successively forming an anode oxide film, a solid electrolyte layer, a graphite layer, and a silver paste layer on a surface of a porous anode body composed of valve metal having an anode lead protruding therefrom;
    forming a resist layer separating the anode lead used as an anode portion and the porous anode body used as a cathode portion;
    connecting an anode lead element to the anode lead and forming a solid electrolytic capacitor component;
    applying a precuring insulating adhesive layer on an insulating portion of a mounting substrate having an anode terminal, a cathode terminal, and the insulating portion therebetween;
    applying and precuring conductive adhesive layers on the anode terminal and the cathode terminal;
    bonding the anode lead element to the precuring conductive adhesive layer on the anode terminal and bonding the silver paste layer to the precuring conductive adhesive layer on the cathode terminal; and
    sealing the solid electrolytic capacitor component with exterior resin,
    wherein the precuring insulating adhesive layer formed on the insulating portion is in contact with both of the precuring conductive adhesive layers formed on the anode terminal and the cathode terminal,
    the resist layer of the solid electrolytic capacitor component is bonded to the insulating portion of the mounting substrate by the precuring insulating adhesive layer, and
    the resist layer, the insulating portion and the precuring insulating adhesive layer each have substantially a same width.

* * * * *